United States Patent
Gipson (10) Patent No.: US 7,469,450 B2
(45) Date of Patent: *Dec. 30, 2008

(54) ARTICULATED WINDOW PANEL WITH HIDDEN HINGE FOR VEHICLES

(75) Inventor: Ronnie G. Gipson, Metamora, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/045,223

(22) Filed: Nov. 9, 2001

(65) Prior Publication Data

US 2003/0088944 A1    May 15, 2003

(51) Int. Cl.
    *E05D 5/00* (2006.01)
(52) U.S. Cl. .............................. 16/382; 16/225; 16/385; 16/386; 16/387
(58) Field of Classification Search .................... 16/272, 16/382, 381, 271, 385, 225, 390, 387, 377, 16/372, 343, 251, 250, 281, 282; 49/398, 49/397, 381, 394; 296/146.16, 201, 216.02; 52/208, 204.62, 204.69
See application file for complete search history.

(56) References Cited

U.S. PATENT DOCUMENTS

| | | | | |
|---|---|---|---|---|
| 3,711,893 A | * | 1/1973 | King | 16/383 |
| 3,815,284 A | * | 6/1974 | Schubach | 49/466 |
| 4,139,234 A | * | 2/1979 | Morgan | 296/201 |
| 4,363,191 A | * | 12/1982 | Morgan | 49/381 |
| 4,396,221 A | | 8/1983 | Morgan et al. | |
| 4,529,157 A | * | 7/1985 | Suman et al. | 248/291.1 |
| 4,761,916 A | * | 8/1988 | Sanok et al. | 49/381 |
| 4,777,699 A | | 10/1988 | Hill et al. | |
| 4,799,344 A | * | 1/1989 | Francis | 52/235 |
| 5,060,440 A | * | 10/1991 | Weaver | 52/204.597 |
| 5,072,984 A | * | 12/1991 | Jackson | 296/56 |
| 5,551,197 A | | 9/1996 | Repp et al. | |
| 5,752,342 A | * | 5/1998 | Kreye | 49/501 |
| 6,032,990 A | * | 3/2000 | Stone et al. | 292/263 |
| 6,123,383 A | * | 9/2000 | Doerflinger et al. | 296/146.16 |
| 6,128,860 A | * | 10/2000 | Repp et al. | 49/398 |
| 6,871,450 B2 | * | 3/2005 | Repp et al. | 49/398 |
| 7,024,822 B2 | * | 4/2006 | Scheer et al. | 49/397 |
| 7,100,328 B2 | * | 9/2006 | Scheer et al. | 49/398 |

FOREIGN PATENT DOCUMENTS

DE    3823717 A1 *    1/1990

\* cited by examiner

*Primary Examiner*—Chuck Y. Mah
(74) *Attorney, Agent, or Firm*—Dean B. Watson (57) ABSTRACT

An articulating window assembly is adapted for use with a support structure. The assembly includes a windowpane with an inner surface. A hinge is adjacent to the inner surface. The hinge includes a cylindrical member having a pivot axis and a stud member attached to the cylindrical member. A polymeric member surrounding at least a portion of the hinge member so as to permit, the hinge member to articulate about the pivot axis.

11 Claims, 7 Drawing Sheets

ARTICULATED WINDOW PANEL WITH HIDDEN HINGE FOR VEHICLES

FIELD OF THE INVENTION

This invention relates generally to flush-mounted window assemblies for vehicles and more particularly, to flush-mounted vehicular window assemblies, which articulate about a hinge, attached to one side of the window.

BACKGROUND AND SUMMARY OF THE INVENTION

In an effort to make automobiles more fuel-efficient, automobile exterior designs are becoming more streamlined. One way to achieve this goal, is through the use of flush-mounted panel and window assemblies. The design goal is to locate the panel or window within the vehicle such that the peripheral edge of the panel or window assembly is recessed and the outer surface of the panel is generally flush with any adjoining body panels. In the case of fixed panels, a conventional technique includes placing or running a bead of adhesive material around the entire inside peripheral edge of the panel and bonding it in the vehicle opening. While satisfactory for stationary windows, this method creates problems with movable windows, however, particularly those which articulate about a hinge.

Conventional articulated or hinged windows are fixed to the vehicle by a mounting assembly which is fastened by a stud passing through a hole drilled in the panel. A low profile nut is then threaded onto the stud extending through the panel to retain the panel thereon. A major disadvantage is that a significant number of glass panels are broken as a result of drilling the holes through the panel. The panels are also broken during or after mounting of the mounting hardware. To avoid the breakage of the glass panel, sophisticated techniques have been adapted to drill the holes, and the mounting hardware has been adapted to reduce breakage. As a result, the price of such panel assemblies is unnecessarily high. Moreover, the resulting panel is not truly flush since the mounting hardware has a positive relief with respect to the panel exterior surface.

An attempt to reduce the exterior profile of articulated window assemblies is disclosed in U.S. Pat. No. 4,396,221. The window assembly employs a channel extending around the edge of the windowpane, a flexible resilient portion allowing pivotal movement of the windowpane, and one of several types of fasteners. Such fasteners include a clip with a detent received in the seal and securing the hinge and thus the assembly to a pinch weld flange.

Another embodiment of the hinged window assembly just described includes a substantially rectilinear hinge member, which includes a retaining end bonded to the exterior or front surface of the window panel by an adhesive and an opposing retaining end having an aperture, which receives a metal screw extending into the vehicle body. Seated on the pinch-weld flange is a sealing weather strip which forms a closed bulbous portion engaging both the inside surface of the pane as well as a shoulder of the recess leading to the pinch-weld flange on the exterior sheet metal body portion. To conceal the fastener for the hinge, a metal covering extending from the vehicle roof or another portion of the vehicle may extend over the fastener and a substantial portion of the hinge.

A disadvantage associated with each of the above hinged windows is that the hinge member is fixed to the exterior surface of the panel. In addition, in the last embodiment described above, the fastener securing the assembly to the vehicle is exposed, or must include a special cover member. Accordingly, the exterior profile of these window assemblies do not result in a truly flush-mounted, articulated window assembly.

U.S. Pat. No. 5,551,197 to Repp et al shows one example of a flush mounted hinge window assembly using an adhesive to bond a metal hinge member to a windowpane. However, such metal hinges as taught in Repp et al have experienced adhesive failures when the articulating window assembly is subjected to repeated cycling between open and closed positions.

U.S. Pat. No. 4,777,699 to Hill et al, discloses a hinge assembly for an articulating window of a motor vehicle, using an elastomeric hinge member. The elastometric hinge member encapsulates a portion of a mounting stud assembly, which is in turn secured to the motor vehicle. The elastomeric hinge member acts both to secure the windowpane to the motor vehicle and to allow the windowpane to articulate between open and closed positions. However, repeated cycling places high stresses on the mounting stud assembly, which can cause the stud to work its way out of the hinge member, resulting in failure of the hinge.

One attempt to solve the above problems with a bonded hinge is disclosed in U.S. Pat. No. 6,128,860. While the bonded hinge resists failure due to severe vibration and extreme climatic conditions, it requires a substantial offset between the first latch portion bonded to the windowpane and the second latch portion attached to the window opening. Thus, this design has not been commercially adapted for thin window recess applications.

Another attempt is shown in U.S. Pat. No. 6,123,383 owned by the assignee of the present application and is incorporated herein by reference. The hinge is composed of a unitary elastomeric material with a portion of the elastomeric surface unbonded to the inner surface of the windowpane. When the window pivots, there is local disengagement of the hinge from the windowpane at the unbonded portion. However, when this concept is applied to thin window recess applications, the elastomeric stresses can still be very large in the bonded area.

The present invention seeks to solve the above problems by providing an articulating window assembly. The pivot is adapted for use with a support structure. The assembly includes a windowpane having an inner surface and a hinge member adjacent to the inner surface. The hinge member includes a cylindrical member having a pivot axis and a stud member attached to the cylindrical member. Additionally, a polymeric member surrounds at least a portion of the hinge member so as to permit the hinge to articulate about the pivot axis.

With a hinged joint, the stresses on the polymeric member are substantially reduced at the attachment area since the window rotates, pivots or, articulates about a mechanical joint and does not require that a substantial portion of the pivoting stresses be accommodated by the polymer. Additionally, the present invention is also advantageous because a more compact hinged joint is possible, which reduces the polymeric stresses in the area between the attachment member and the windowpane.

From the foregoing disclosure and the following more detailed description of various preferred embodiments, it will be apparent to those skilled in the art that the present invention provides a significant advance in the technology and art of articulated window assemblies. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of an articulated window assembly as disclosed here, including, for example, specific dimensions of the hinge member and the latch mount, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicate, refer to the orientation of the articulated window assemblies illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the articulated window assemblies disclosed here. The following detailed discussion of various alternative and preferred features and embodiments will illustrate the general principles of the invention with reference to a flush mounted window assembly for use as a side window on a minivan type motor vehicle. Other embodiments suitable for other applications, such as three-sided flip windows and articulating windows for pickup trucks, sport utility vehicles, cross-over vehicles, or van conversions, will be apparent to those skilled in the art given the benefit of this disclosure.

Figure 1:
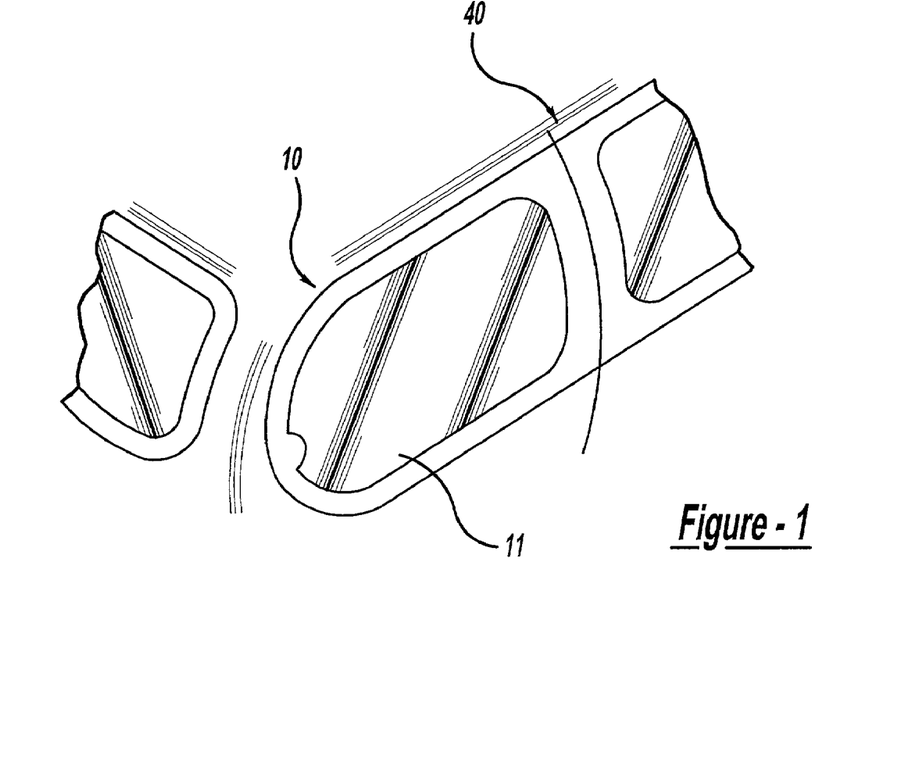
FIG. 1 is a perspective view of a flush-mounted articulated window assembly shown in assembly in a motor vehicle in accordance with a preferred embodiment.
Figure 2:
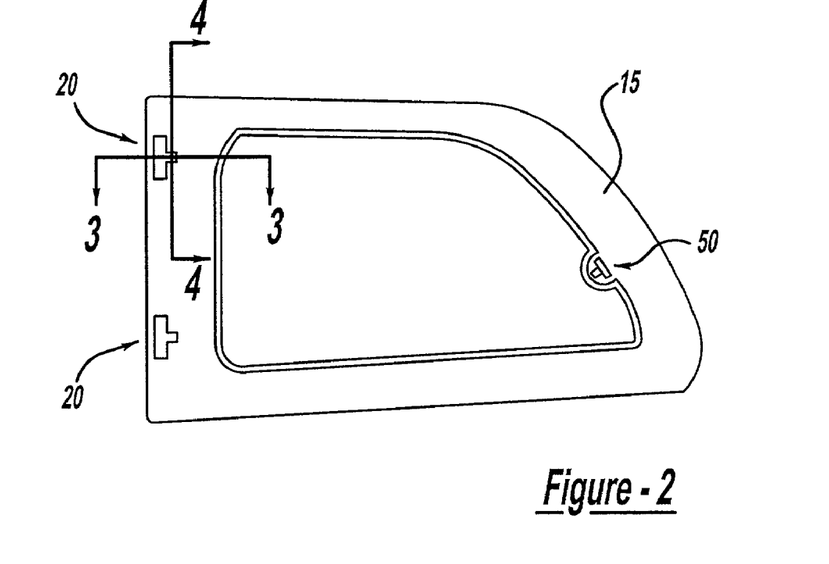
FIG. 2 is an elevation view of the inner surface of the window assembly of FIG. 1, showing an inner surface of the windowpane.
Figure 3:
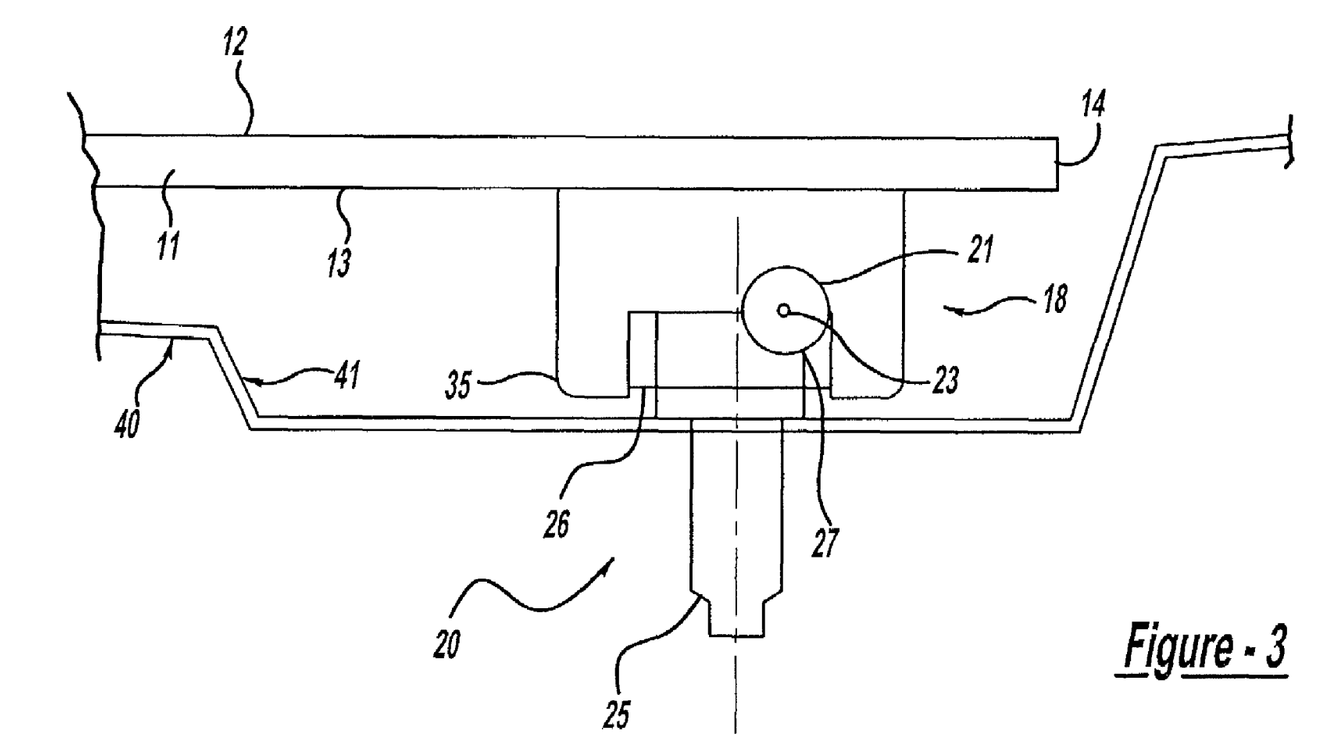
FIG. 3 is a cross sectional view, partially broken away, of the window assembly of FIGS. 1-2, taken along line 3-3 in FIG. 2, shown in a closed position.
Figure 4:
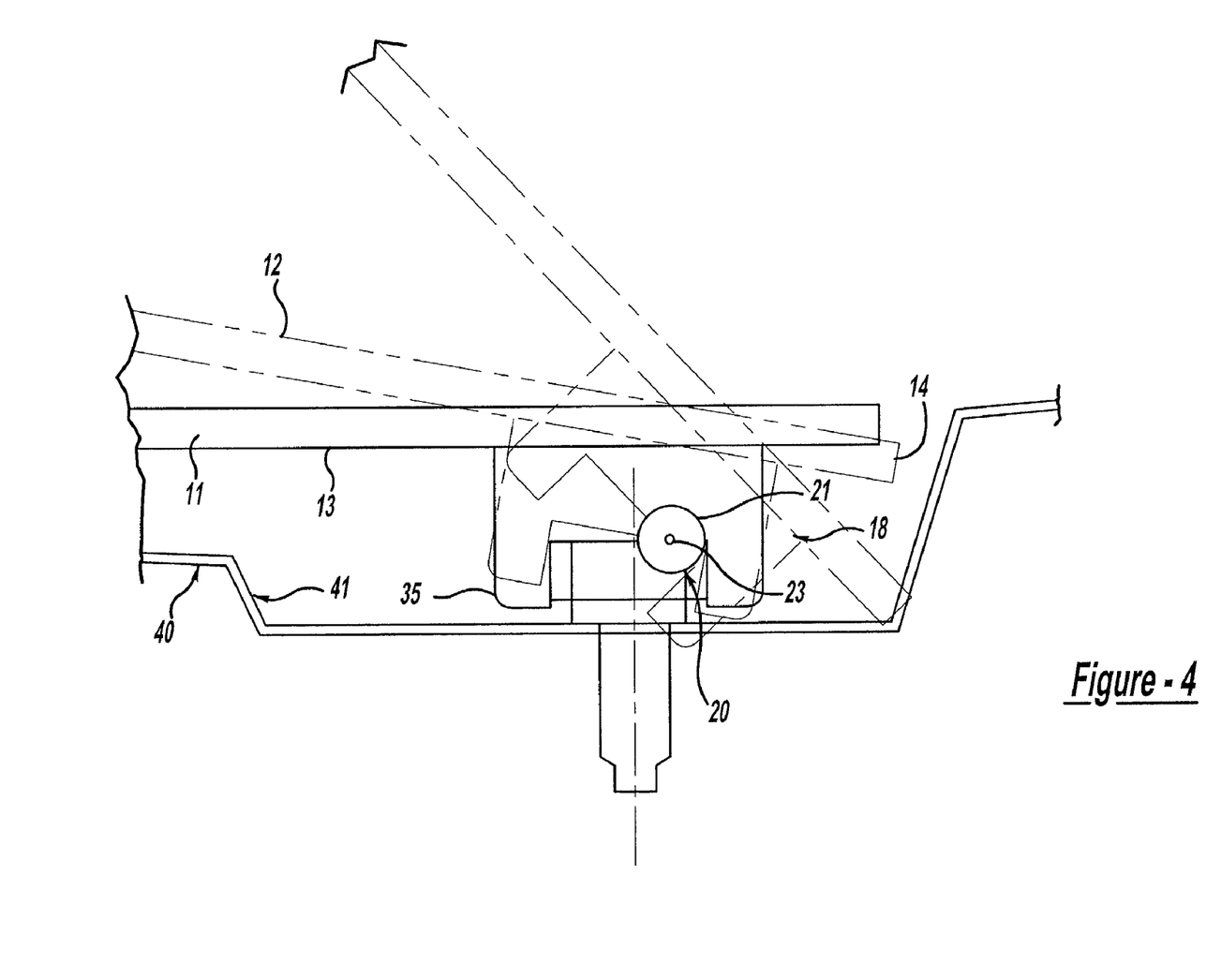
FIG. 4 is a cross sectional view corresponding to FIG. 3, shown in an open or articulated position.
Figure 5:
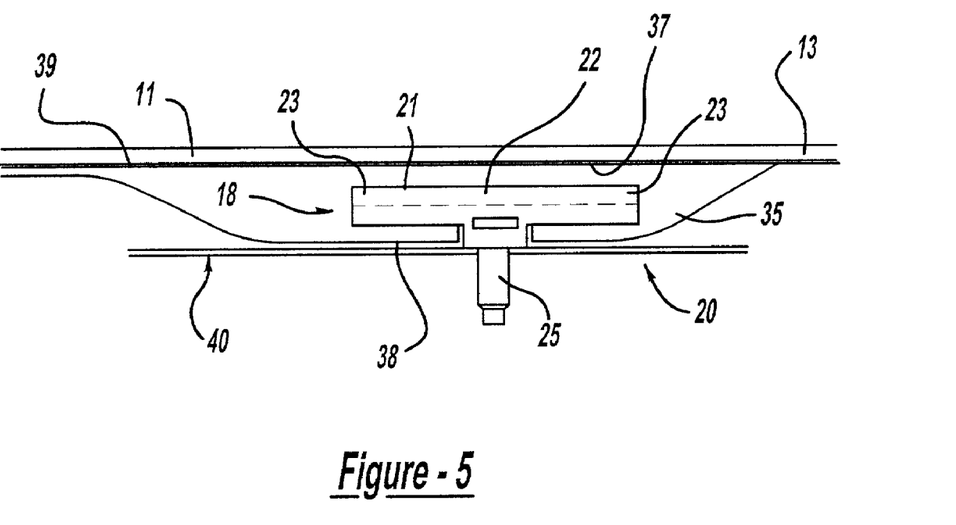
FIG. 5 is a cross sectional view of the hinge mount of the window assembly taken along line 4-4 in FIG. 2.
Figure 6:
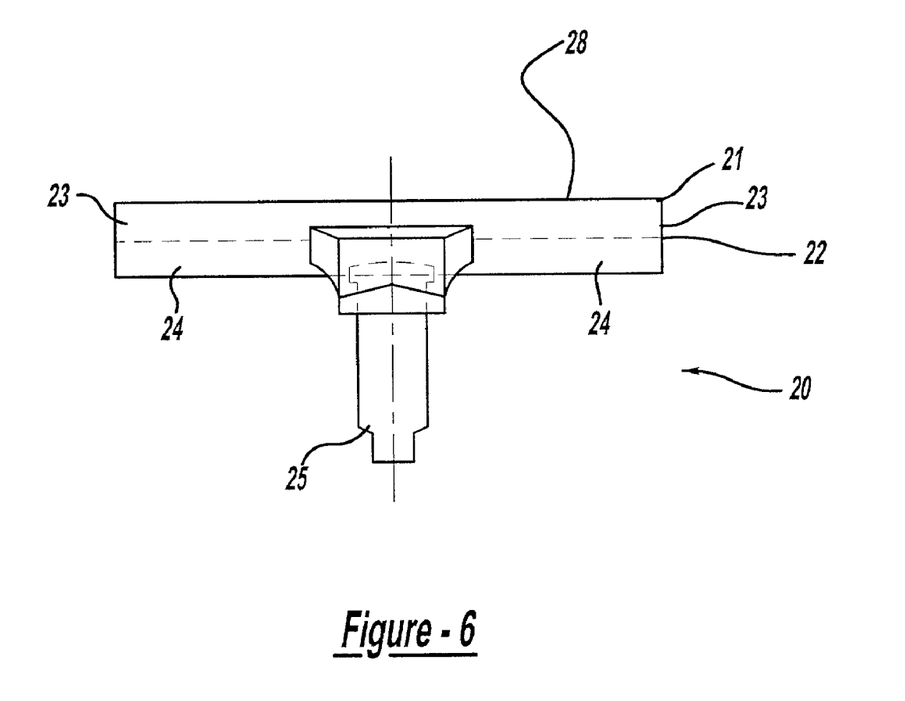
FIG. 6 is a side view of the cylindrical rod and stud of FIGS. 1-2.
Figure 7:
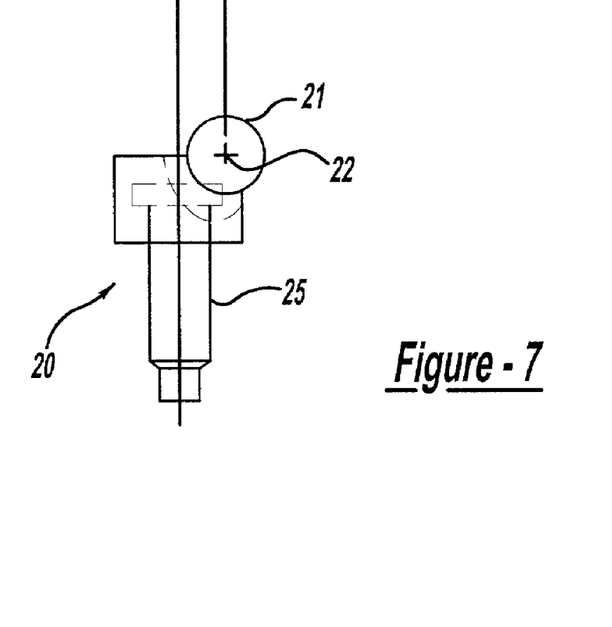
FIG. 7 is a side view rotated 90 degrees from FIG. 6.

Referring now to the drawings, FIGS. 1 and 2 show an articulating window assembly 10 in a motor vehicle body panel 40 pivotable between a closed position as shown and an open position (not shown). As shown in FIGS. 1-4, window assembly 10 has a windowpane 11 with an outer surface 12, an inner surface 13, a peripheral edge 14 for exterior styling. An opaque frit 15 is positioned around the peripheral edge, concealing attachment mechanisms such as hinge member 20 and a latch mount 50 from exterior view. Where the windowpane 11 is made of glass, the frit is commonly a ceramic frit. It should be understood that, reference here to the inner surface 13 of the windowpane 11 may mean with or without frit, primer, etc. Window assembly 10 is in a recess defined by peripheral ledge 41 of body panel 40 surrounding and closing an opening. In certain preferred embodiments, outer surface 12 of windowpane 11 is positioned generally flush with an exterior surface of motor vehicle body panel 40. Optionally, a conventional seal assembly may be positioned around the window assembly to prevent water, dirt and the like from entering the motor vehicle through opening when the window assembly 10 is in the closed position. Flush-mounted articulated window assembly 10 is attachable to motor vehicle body panel 40 by attachment member 18. Attachment member 18 includes hinge member 20 and polymeric member 35. As shown in FIGS. 5-10, hinge 20 includes cylindrical rod 21, stud 25, and optionally base plate 30. Cylindrical rod 21 has a pair of arms 23 that form an axle 28 to rotate about pivot axis 22. Each arm 23 has bearing surface 24 for a purpose to be described later on. Stud 25 extends from cylindrical rod 21 substantially perpendicularly of pivot axis 22. Stud 25 has an offset 26 to space away stud 25 from pivot axis 22. Offset 26 permits moving the pivot axis 22 away from the longitudinal axis of stud 25 and permits greater articulation of windowpane 11 as assembly 10 moves from a closed position to on open position and back.

The polymeric member 35 serves several important functions. Polymeric member 35 secures the hinge member 20 to windowpane 11 by bonding to inner surface 13 windowpane 11 at first surface 37. Preferably, polymeric member 35 also encapsulates at least a portion of hinge 20. Stud 25 is threadably attached to the motor vehicle 40 near second surface 38 of polymeric member 35. Attachment member 18 permits windowpane 11 to articulate or pivot with respect to the motor vehicle 40. Preferably, polymeric member 35 is composed of a reaction injection molded polyurethane (RIM material), formed by injection molding a polyol and an isocyanate together into a mold cavity of a heated mold. The shape of the mold cavity will determine the shape of polymeric member 35. Alternative suitable polymeric materials for polymeric member 35 are polyvinyl chloride, thermoplastic, thermoplastic elastomers, and elastomers such as EPDM, butyl rubber, silicone, and neoprene. Other suitable materials will be apparent to those skilled in the art given the benefit of this disclosure.

In a highly advantageous feature, primer or adhesive 39 is applied conventionally on inner surface 13 of windowpane 11 prior to application of polymeric member 35 to windowpane 11. Preferably, primer 39 is applied near the peripheral edge on inner surface 13 of windowpane 11. When polymeric member 35 is composed of RIM material, and windowpane 11 has a surface made of soda-lime-silica glass, primer 39 is preferably a silane primer. Examples of silane primers include Chemlok® 144 and Chemlok® AP-134 manufactured by Lord Corporation of Erie, Pa. Without wishing to be bound by any one product, it currently is believed that the surface of the glass in the windowpane has hydroxyl groups, which bond with silane groups of the primer, and the polyurethane has isocyanates, which react with silane groups of the primer, thereby forming an excellent bond between the windowpane and the RIM material. Other combinations of primers and polymeric materials will be apparent to those skilled in the art given the benefit of this disclosure. Primer 39 is applied to windowpane 11 near an area where first surface 37 of the polymer member 35 will be positioned for bonding to windowpane 11.

Figure 8:
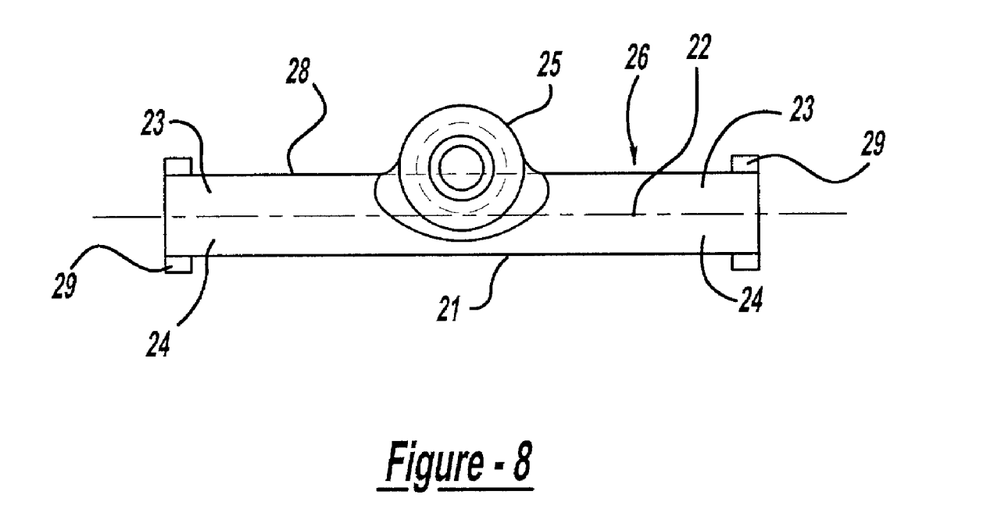
FIG. 8 is a top view of FIG. 6.

Cylindrical rod 21 is optionally coated with a layer of barrier coat on bearing surfaces 24 such as Monocoat® 1021w or Monocoat® 472w manufactured by Chem-Trend Inc. of Howell, Mich., to prevent polymeric material 35 from adhering to bearing surfaces 24 of rod 21. This assures that polymer 35 does not prevent cylindrical rod from pivoting or articulating in polymer 35 when surrounded by polymer 35. Optionally, sleeve 29 may be adjacent bearing surface 24 to aid in pivoting of hinge 20 (as shown in FIG. 8).

Figure 9:
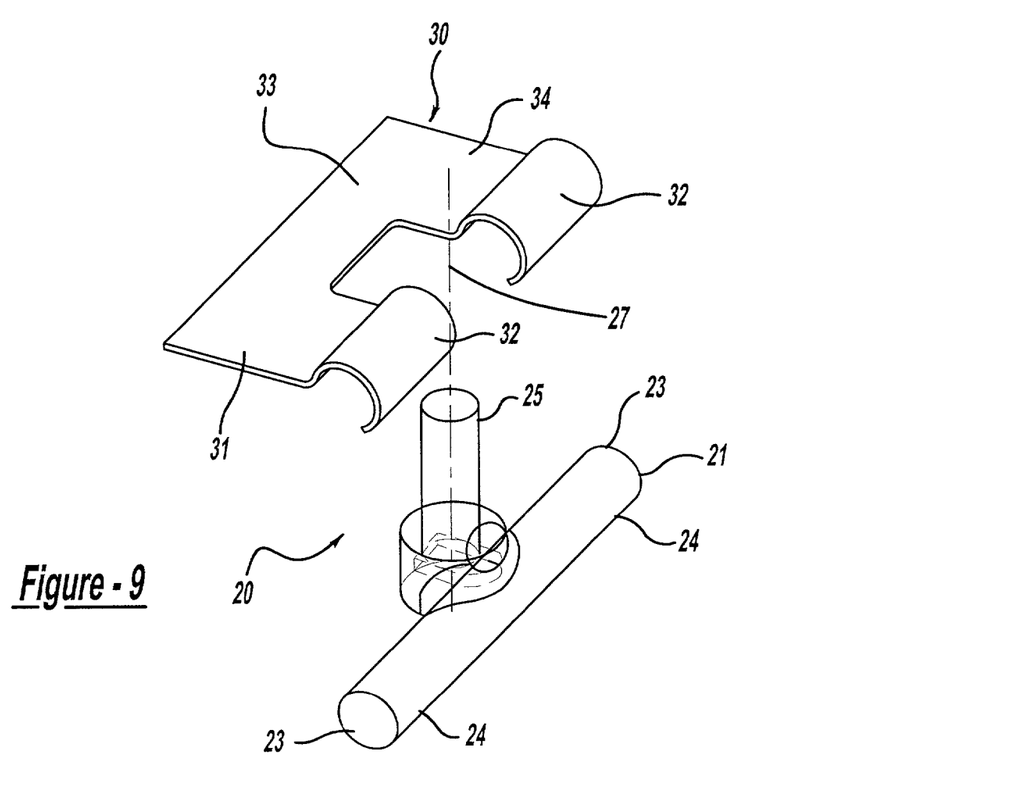
FIG. 9 is an exploded view of cylindrical rod, stud and base.
Figure 10:
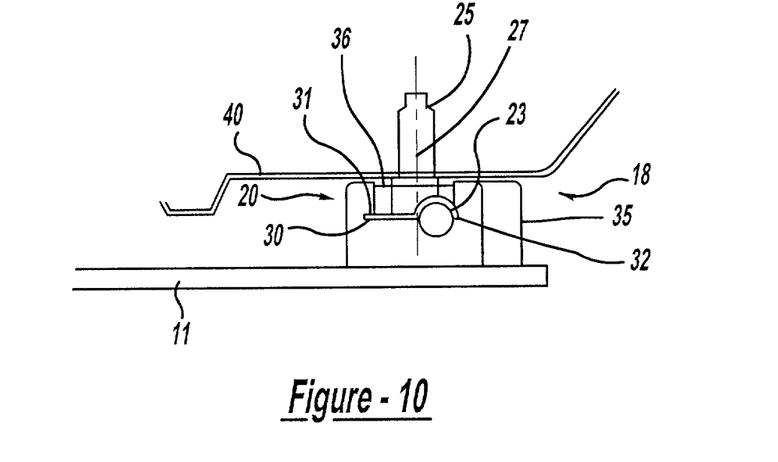
FIG. 10 is a cross sectional view of attachment member in a motor vehicle.

Optionally (as shown in FIGS. 9 and 10), base plate 30 is used to prevent cylindrical member 21 and stud 25 from working free of polymer member 35 and to support rod 21. Base plate member 30 has surface area 33 with generally flat portion 31 and pair of arcuate portions 32. Optionally, flat portion 31 may include curved portions and non-planar portions to increase surface area 33. Both sides of flat portion 31 may be optionally coated with a suitable primer or adhesive to increase bonding to polymer 35. Optionally, the inner surface area of arcuate portion 32 is coated with a layer of barrier coat to prevent polymeric material 35 from adhering to arcuate portion 32 which operatively engages bearing surface 24 of cylindrical rod 21 and preventing articulation of rod 21 in arcuate portion 32. Arcuate portion 32 engages surface 24 and cradles arms 23 therein.

Figure 11:
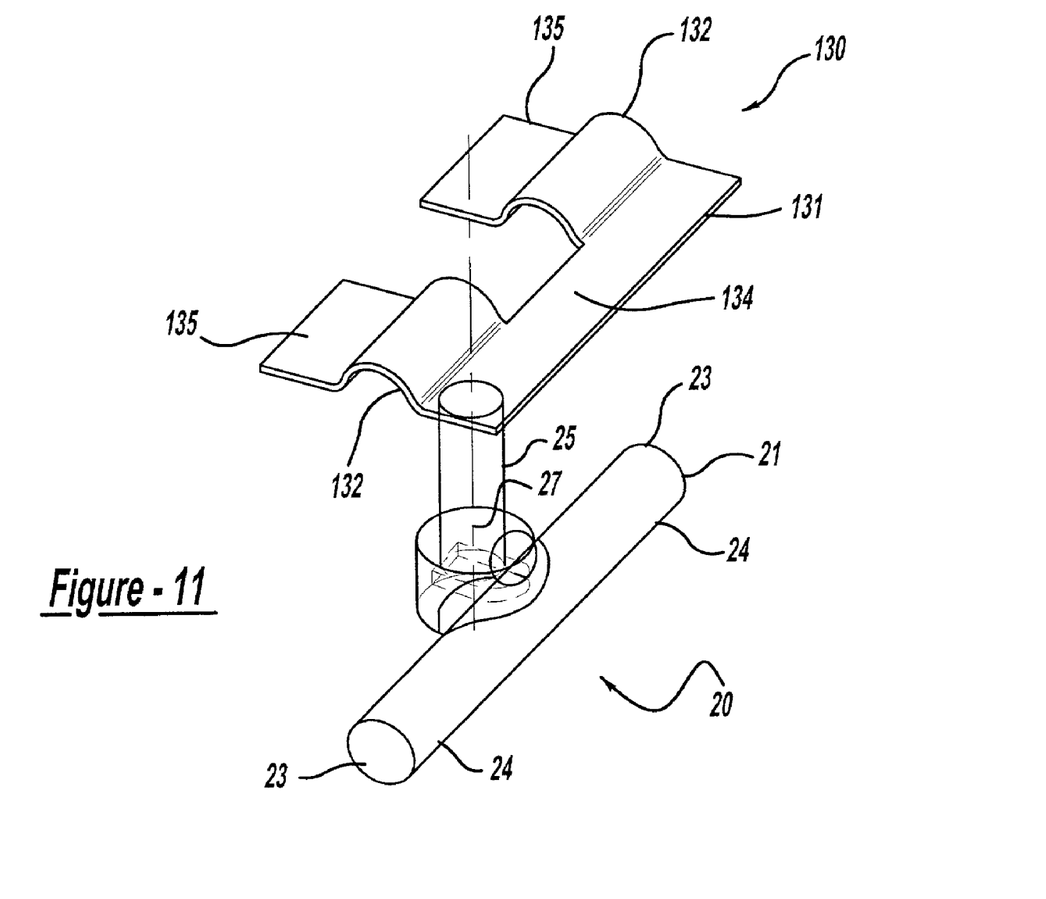
FIG. 11 is an exploded view of an alternate base plate with cylindrical rod and stud.
Figure 12:
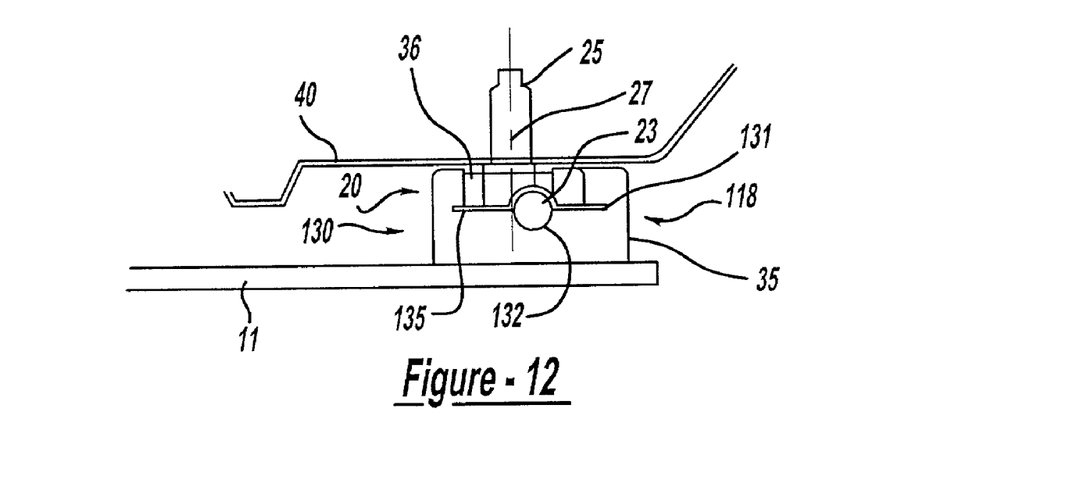
FIG. 12 is a cross sectional view of an alternate attachment member in a motor vehicle.

Alternatively, as shown in FIGS. 11-12, attachment member 118 with base plate 130 is used in conjunction with cylindrical rod 21 and stud 25. Base plate 130 has an enlarged surface area 132 with first flat portion 131 and a pair of second flat portions 135 and a pair of arcuate portions 132 in between portions 131, and 135 respectfully. Second flat portions 135 and arcuate portions 132 are connected to first portion 131. Optionally, the inner surface of arcuate portions 132 is coated with a layer of barrier coat to prevent polymeric material 35 from adhering to the bearing surface 24 of cylindrical rod 21. The enlarged surface area 132 provides additional bonding surface to the polymer 35 to increase the load carrying capability of attachment member 118. In all other aspects, base plate 130 is similar to base plate 30 and is at least partially encapsulated in polymer 35 as described earlier.

Those skilled in the art will recognize that rod 21 is guided by the inner surface of arcuate portion 32 so that rod 21 is able to rotate, articulate, or pivot about pivot axis 22 relative to base 30. Additionally, base plate members 30, 130 also provide additional bonding surface area with polymer 35 so as to prevent the rod and stud from working free of polymeric member 35.

Optionally, other structural reinforcing members may be added to increase the load carrying capacity of attachment member 18. The structural reinforcing members may be imbedded into polymeric material 35 but spaced away from base plate member 30, 130 respectively.

To further improve the pivoting capability of attachment member 18, cavity 36 is formed in polymeric material 35 adjacent to the surface of shaft 27 of stud 25. Cavity 36 permits shaft 27 to oscillate, or articulate in cavity 36 surrounding shaft 27 to aid in window assembly 10 pivoting or articulating relative to motor vehicle body panel 40. Cavity 36 may be any suitable shape including round, square, rectangular, polygonal, triangular, elliptical, truncated or any other suitable shape. Cavity 36 is formed in the mold used to form attachment members 18, 118 respectively as is well known in the art.

Cylindrical rod 21 may be made of any suitable material such as die cast zinc. Alternatively, rod 21 may be made of aluminum, steel, thermoplastic, thermoset plastic and magnesium and formed using a cast process, injection process, die casting process, forging process and machining. Preferably, stud 25 is made of the same material as rod 21 but any other suitable material following the teaching of the invention may be used. Rod 21 and stud 25 may be optionally electro plated to resist corrosion and to promote adhesion to polymer 35.

Attachment 18 may optionally be used as latch mount 50 that is bonded to windowpane 11 in a manner described earlier.

Preferably, manufacturing of the articulating window assembly is accomplished by inspecting, preparing and cleaning a windowpane. Then primer 39 is applied to inner surface 13 of the windowpane 11. The hinge 20 is inserted into a mold cavity of a mold. The mold is then closed. Next, curable material of polymeric member 35 is injected into the mold cavity, at least partially encapsulating the mounting stud 25 and the base member 30 to form attachment member 18. The hinge 20 is bonded to inner surface 13 of windowpane 11. The windowpane 11 with attachment member 18 bonded thereto, can then be removed from the mold cavity.

In operation, when an operator or passenger in the motor vehicle wishes to open window assembly 10, latch 50 is disengaged from body panel 40 thereby permitting windowpane 11 to articulate outboard of the motor vehicle about hinge 20. Hinge 20 permits windowpane 11 to pivot about axis 22 from a closed position to an open position and back.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention as claimed is:

1. An articulating window assembly for use with a support structure in a vehicle, the assembly comprising, in combination:
   a windowpane having an inner surface;
   an attachment member attached to the inner surface, the attachment member including:
   i.) a fixed member including a polymeric member; and
   ii.) a pivot member, the fixed member and the pivot member coupled at a hinged joint about which the pivot member rotates about a pivot axis; and
   the polymeric member molded about a portion of the pivot member to attach the pivot member to the windowpane, yet allow the windowpane to rotate about the pivot axis.

2. The articulating window assembly of claim 1 wherein the polymeric member includes a portion forming a cavity in which the pivot axis resides.

3. The articulating window assembly of claim 1 wherein the polymeric material is one of an elastomer, a thermoplastic, a thermoset plastic and a polyurethane, the polymeric material being attached by one-sided bonding to a portion of the windowpane.

4. The articulating window assembly of claim 1 wherein the pivot member includes a rod portion having a longitudinal axis, and the fixed member includes a support portion to cradle the rod portion to permit rotation of the pivot member.

5. The articulating window assembly of claim 4 wherein the pivot member includes an attachment stud that is offset from the pivot axis of the pivot member.

6. The articulating window assembly of claim 1 wherein the fixed member and the pivot member are coupled in a way to allow rotation of the windowpane in a manner that does not create a substantial amount of pivoting stress required to be accommodated by the polymeric member.

7. The articulating window assembly of claim 1, wherein the polymeric member is injection molded RIM material attached to only one side of the windowpane.

8. A flush-mount, articulating vehicular window assembly adapted for use with a support structure of the vehicle, the assembly comprising in combination:

a windowpane having an inner surface;

a hinge having a fixed member and a pivot member coupled at a hinge joint, the hinge connected to the windowpane and having a rotational pivot axis;

the hinge including a polymeric member molded about a portion of the fixed member to connect the fixed member to one side of the windowpane, the hinge joint formed so as to permit the windowpane to pivot about the pivot axis from a closed position which is substantially flush to the vehicle body to an open position, wherein the pivot member includes a stud, the stud being offset from the rotational pivot axis.

9. The flush-mount, articulating vehicular window assembly of claim 8, wherein the fixed member includes a base member, and the pivot member includes a cylindrical member coupled with the base member to form the hinge joint, the stud extending from the cylindrical member.

10. The flush-mount, articulating vehicular window assembly of claim 9, wherein the hinge joint is formed to allow rotation of the windowpane in a manner that does not create a substantial amount of pivoting stress required to be accommodated by the polymeric member.

11. The flush-mount, articulating vehicular window assembly of claim 9, wherein the hinge joint is at least partially covered by the polymeric member and bonded to the inner surface of the windowpane to permit articulation of the window assembly about the hinge.

* * * * *